United States Patent
Dixon

(10) Patent No.: US 10,306,583 B2
(45) Date of Patent: May 28, 2019

(54) SYSTEMS AND METHODS TO EVALUATE ACCURACY OF LOCATIONS OF MOBILE DEVICES

(71) Applicant: NinthDecimal, Inc., San Francisco, CA (US)

(72) Inventor: Mark Christopher Dixon, Belmont, CA (US)

(73) Assignee: NINTHDECIMAL, INC., San Francisco, CA (US)

(*) Notice: Subject to any disclaimer, the term of this patent is extended or adjusted under 35 U.S.C. 154(b) by 0 days.

(21) Appl. No.: 16/171,097

(22) Filed: Oct. 25, 2018

(65) Prior Publication Data
US 2019/0098599 A1    Mar. 28, 2019

Related U.S. Application Data

(63) Continuation of application No. 15/716,097, filed on Sep. 26, 2017, now Pat. No. 10,117,216.

(51) Int. Cl.
| | |
|---|---|
| *H04W 64/00* | (2009.01) |
| *G06N 5/04* | (2006.01) |
| *G06N 99/00* | (2019.01) |
| *H04W 16/24* | (2009.01) |
| *G06N 20/00* | (2019.01) |

(52) U.S. Cl.
CPC .............. *H04W 64/00* (2013.01); *G06N 5/04* (2013.01); *G06N 20/00* (2019.01); *G06N 99/005* (2013.01); *H04W 16/24* (2013.01)

(58) Field of Classification Search
CPC .............................. H04W 64/00; H04W 16/24
USPC .......... 455/456.1, 456.2, 456.3, 414.1, 414.2
See application file for complete search history.

(56) References Cited

U.S. PATENT DOCUMENTS

| | | | |
|---|---|---|---|
| 9,307,360 B1* | 4/2016 | Zhyshko | ................. H04W 4/02 |
| 2015/0346313 A1* | 12/2015 | Smith | ................... G01S 5/0252 |
| | | | 342/465 |

* cited by examiner

*Primary Examiner* — Chuck Huynh
(74) *Attorney, Agent, or Firm* — Greenberg Traurig, LLP

(57) ABSTRACT

Systems and methods to identify a region in which a mobile device is located, by: applying device attributes of the mobile device and region attributes of coordinates of the mobile device to a predictive model to generate an accuracy indicator, identifying a plurality of locations from the coordinates of the mobile device that represent one point and the accuracy indicator, converting coordinates of the locations to cell identifiers of a grid reference system, determining region(s) containing the locations by finding matching cell identifiers that are pre-associated with the region(s), and determining a confidence level of a region that contains at least a portion of the locations based on the weights of locations in the portion. The region is identified in response to a determination that the confidence level is above a threshold.

20 Claims, 13 Drawing Sheets

SYSTEMS AND METHODS TO EVALUATE ACCURACY OF LOCATIONS OF MOBILE DEVICES

RELATED APPLICATIONS

The present application is a continuation application of U.S. patent application Ser. No. 15/716,097, filed Sep. 26, 2017 and issued as U.S. Pat. No. 10,117,216 on Oct. 30, 2018, the entire disclosure of which application is hereby incorporated herein by reference.

The present application relates to U.S. patent application Ser. No. 15/016,067, filed Feb. 4, 2016 and issued as U.S. Pat. No. 9,756,465 on Sep. 5, 2017, which is a continuation application of U.S. patent application Ser. No. 14/593,947, filed Jan. 9, 2015 and issued as U.S. Pat. No. 9,307,360 on Apr. 5, 2016, the entire contents of which applications are hereby incorporated by reference as if fully set forth herein.

FIELD OF THE TECHNOLOGY

At least one embodiment of the disclosure relates to the determination of regions in which mobile devices are located in general and more specifically but not limited to, computational efficient ways to identify predefined regions in which mobile devices are located.

BACKGROUND

A location determination system, such as a Global Positioning System (GPS), allows a mobile device, such as a mobile phone, a smart phone, a personal media player, a GPS receiver, etc., to determine its current location on the earth. The location of the mobile device is typically calculated as a set of coordinates, such as the longitude and latitude coordinates of a point on the surface of the earth.

However, the location of the mobile device in the form of coordinates of a point on the surface of the earth does not provide sufficient information of interest about the location, such as whether the mobile device is within a particular region associated with a set of known properties.

For example, it may be of interest in certain applications to determine whether the location of the mobile device is within the store of a merchant, within the home of the user of the mobile device, within a recreation area, within a commercial district, etc.

For example, U.S. Pat. App. Pub. No. 2014/0012806, published Jan. 9, 2014 and entitled "Location Graph Based Derivation of Attributes", discusses the generation of a user profile based on mapping the locations of a mobile device to predefined geographical regions and use the attributes associated with the predefined geographical regions to derive and/or augment the attributes of the user profile.

For example, U.S. Pat. App. Pub. No. 2008/0248815, published Oct. 9, 2008 and entitled "Systems and Methods to Target Predictive Location based Content and Track Conversions", discusses the need to analyze the location of a mobile device to determine the types of businesses that the user of the mobile device typically visits, or visited. When the location of a mobile device is within a predefined distance from either the address of a particular business or a geographic location associated with the business, or within a geometric perimeter of the particular business location, it may be determined that the user of the mobile device was at the particular business.

Ray Casting is a known technology to determine whether a given point is within a polygon represented by a set of vertexes. However, Ray Casting is computational intensive involving floating point number computations.

The Military Grid Reference System (MGRS) is a standard used for locating points on the earth. It uses grid squares of various lengths at different resolutions, such as 10 km, 1 km, 100 m, 10 m, or 1 m, depending on the precision of the coordinates provided. A MGRS coordinate includes a numerical location within a 100,000 meter square, specified as n+n digits, where the first n digits give the easting in meters, and the second n digits give the northing in meters.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

One embodiment of the disclosure provides a computationally efficient method and system to determine whether a location of the mobile device is within a predetermined geographical boundary of a region and/or to determine, among a plurality of predefined regions, the identity of one or more regions within which the location of the mobile device is positioned.

Figure 1:
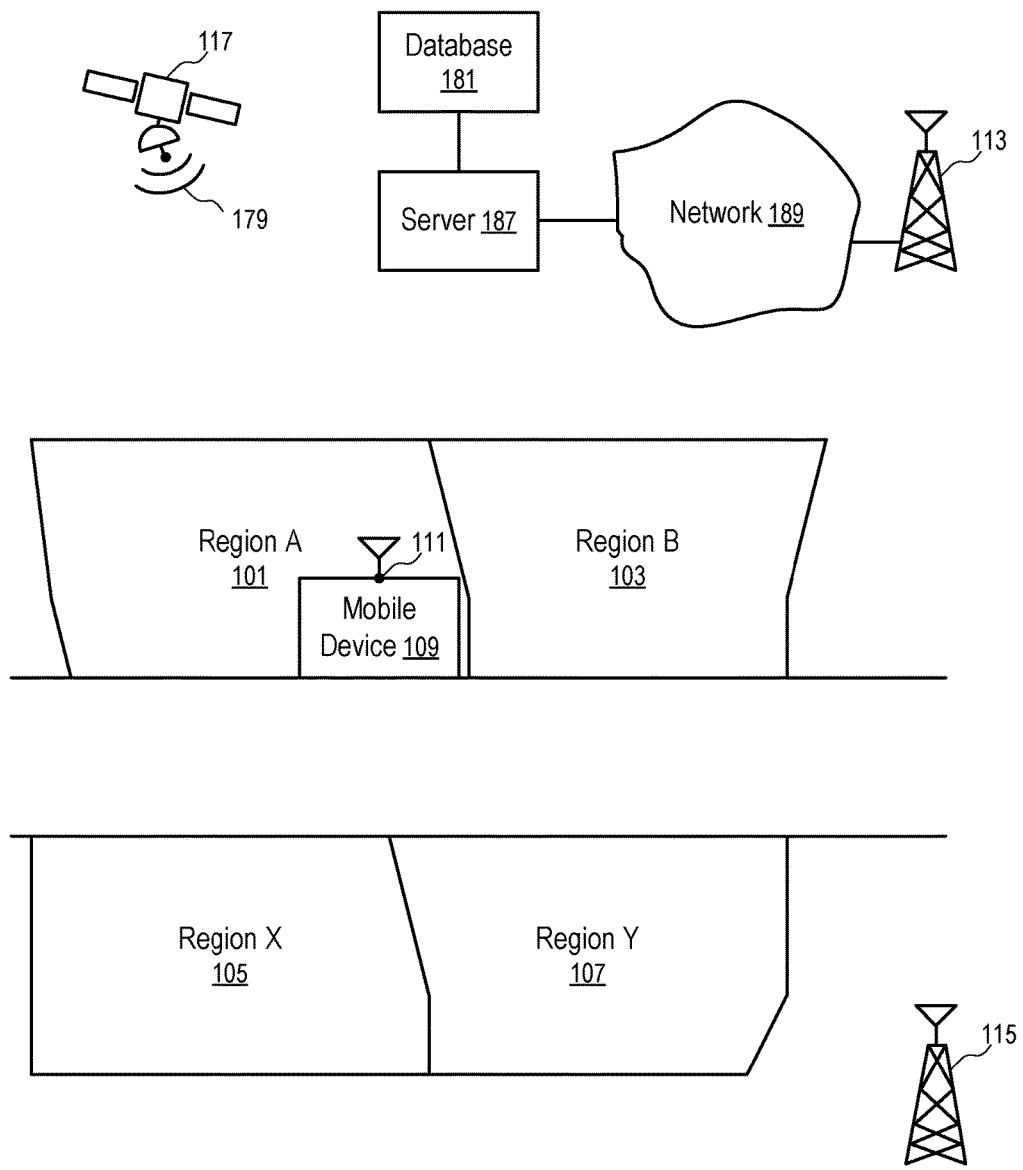
FIG. 1 shows a system to determine whether a mobile device is within a region having a predetermined geographical boundary according to one embodiment.

FIG. 1 shows a system to determine whether a mobile device is within a region having a predetermined geographical boundary according to one embodiment.

In FIG. 1, a location determination system uses the wireless signals (e.g., 179) transmitted to and/or from the mobile device (109) to determine the location (111) of the mobile device (109) on the surface of the earth.

For example, the location determination system may use Global Positioning System (GPS) satellites (e.g., 117) (and/or base stations (e.g., 115)) to provide GPS signals to the mobile device (109). The mobile device (109) is configured to determine the location (111) of the mobile device (109) based on the received GPS signals. In general, multiple GPS satellites (e.g., 117) and/or base stations (e.g., 115) are used to provide the wireless signals (e.g., 179) from different locations for a GPS receiver to determine its locations.

In FIG. 1, the mobile device (109) is configured with a cellular communications transceiver to communicate with the base stations (e.g., 113, 115) of a cellular communications network.

For example, in one embodiment, the mobile device (109) is configured to use signal delays in the cellular communications signals to or from a plurality of cellular base stations (e.g., 113, . . . , 115) to compute the location coordinates of the mobile device (109).

In FIG. 1, a server (187) is configured to communicate with the mobile device (109) via the network (189) and the cellular communications infrastructure (e.g., the base station (113)). The server (187) is connected to a database (181) storing information about the predefined regions (e.g., 101, 103, . . . 105, 107).

For example, the database (181) is configured to store the identifications of a set of cells that are within the boundary of a region (e.g., 101). The server (187) is configured to convert the location (111) of the mobile device (109) to a cell identification and search the identifications of the set of cells representing the region (101) to determine if the cell identification converted from the location (111) of the mobile device (109) is in the set of cell identifications representing the region (101). If the cell identification of the location (111) is found in the set of cell identifications representing the region (101), the location (111) is considered being within the boundary of the region (e.g., 101).

In one embodiment, a hierarchical grid system is used to construct cells that are within the boundary of the region (e.g., 101). Thus, the number of cells within the region (e.g., 101) can be reduced, while the precision of the determination can be selected at a desired level (e.g., 1 meter).

In one embodiment, the identifications of the cells are configured to be signed integer numbers. Thus, any known technologies for searching a given number within a set of signed integer numbers can be used to efficiently determine whether the cell identifier of a location (111) is within the set of cell identifiers of the region (101).

In one embodiment, the conversion of the location coordinates to a cell identifier is configured for improved computation efficiency. The cell identifier is also configured for efficient determination of the resolution of the grid in which the cell is located, the coordinates of the vertexes of the cell, the bounding boxes of the cell, and the identifications of the neighbors of the cells. Details and examples are provided below.

In one embodiment, a given region (e.g., polygon) on earth is represented by a set of cells in a hierarchical, regular grid in a longitude latitude space. In the longitude latitude space, the cells are uniform rectangles/squares at a given resolution; the cell identifies are constructed from the digits of the longitude/latitude coordinates for improved efficiency in conversion between coordinates and cell identifiers. In one embodiment, the resolution levels of the grids correspond to the precision of the longitude/latitude coordinates in terms of the number of digits used to after the decimal point to represent the longitude/latitude coordinates.

Figure 13:
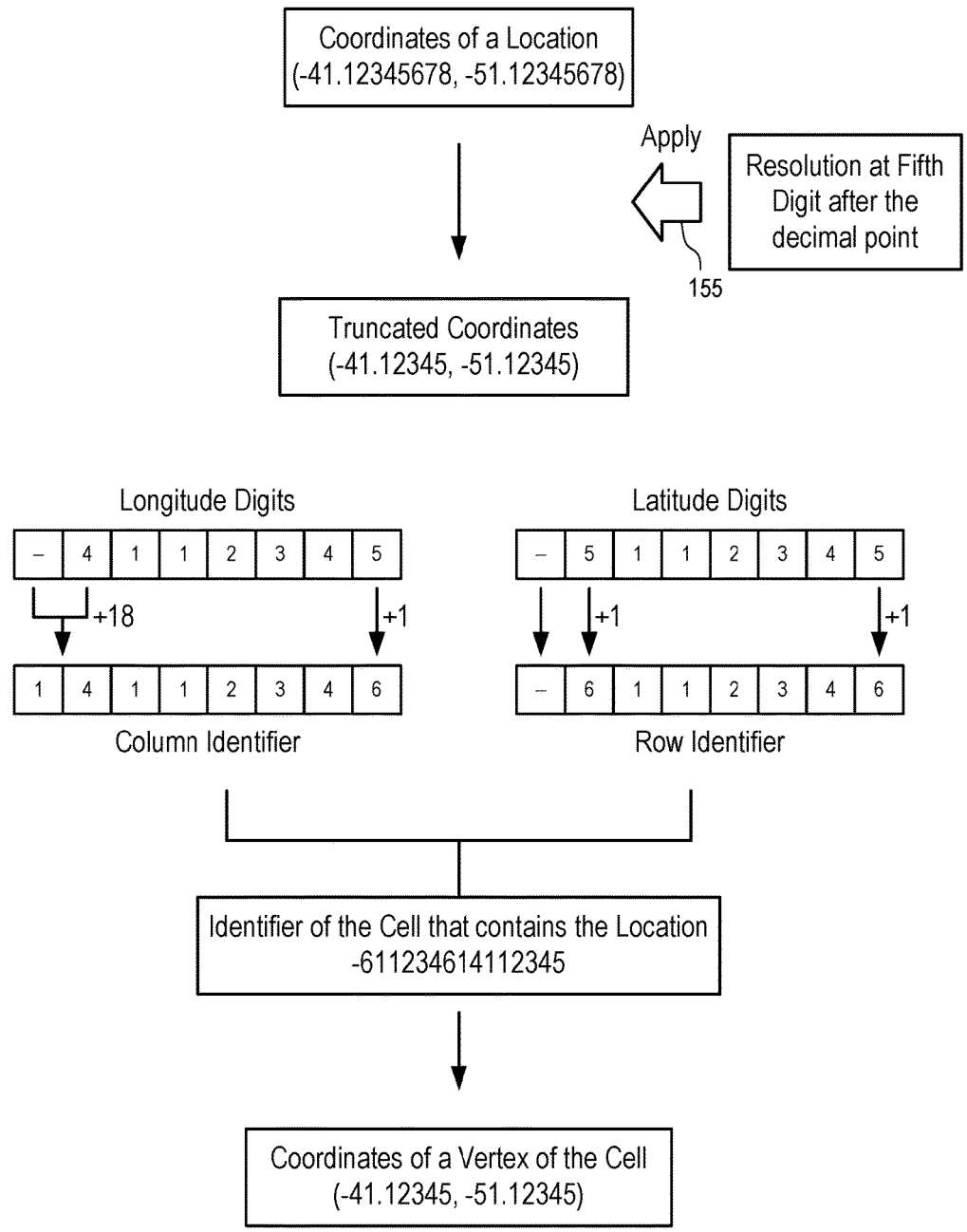
FIG. 13 illustrates an example of converting the coordinates of a location to an identifier of a cell and converting the identifier of the cell to the coordinates of a vertex of the cell according to one embodiment.

At a given resolution in the grid, the identity of the cell that contains a given point identified by a longitude/latitude pair can be computed via simple manipulations of the digits of the longitude/latitude pair, as illustrated in FIG. 13.

Figure 2:
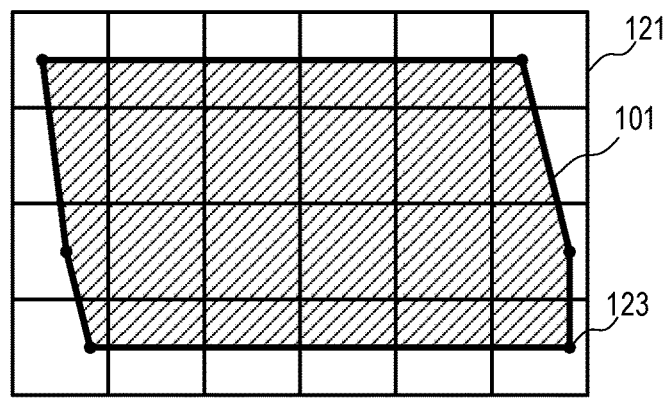
FIGS. 2-4 illustrate a grid system used to determine whether a location of a mobile device is within the geographical boundary of a region according to one embodiment.
Figure 3:
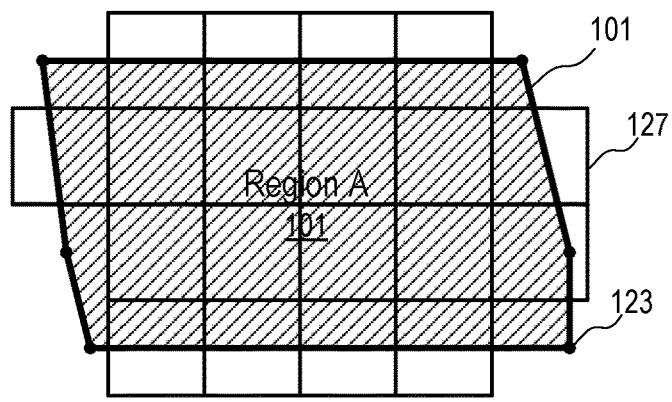
Figure 4:
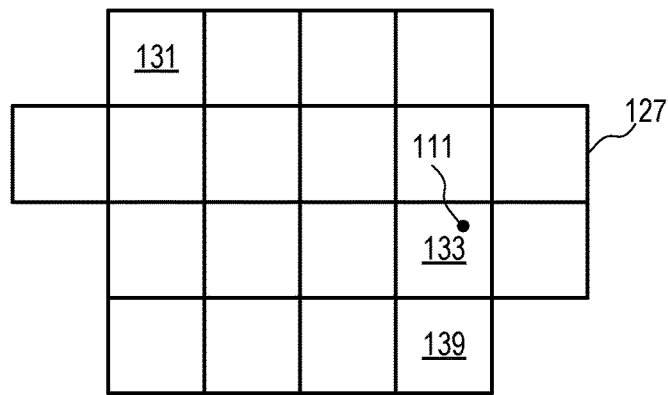

FIGS. 2-4 illustrate a grid system used to determine whether a location of a mobile device is within the geographical boundary of a region according to one embodiment.

In FIG. 2, a grid (121) of cells is used to identify an approximation of the region (101) at a given level of resolution of the grid (121). The resolution level corresponds to the size of the cells in the grid (121).

In FIG. 2, the region (101) is represented as a polygon having a set of vertexes (e.g., 123). The set of line segments connecting the neighboring vertexes (e.g., 123) of the region (101) defines the boundary of the region (101).

FIG. 3 illustrates the selection of a set of cells (e.g., 127) that are considered to be within the boundary of the region (101). Various different methods and/or criteria can be used to classify whether a cell is within the boundary of the region (101), especially the cells that are partially in the region (101) and contain a portion of the boundary of the region (101). The disclosure of the present application is not limited to a particular way to identify or classify whether a cell that is within the boundary of the region (101).

For example, a cell may be classified as being with the region (101) when the overlapping common portion between the cell and the region (101) is above a predetermined percentage of the area of the cell.

For example, a cell may be classified as being with the region (101) when a length of one or more segments of the region (101) going through the cell is above a threshold.

For example, the vertexes of the region (101) may be mapped to the nearest grid points to determine an approximation of the boundary of the region (101) that aligns with the grid lines to select the cells that are located within the approximated boundary of the region (101).

FIG. 4 illustrates the determination of the location (111) within the set of cells (131, . . . , 133, . . . , 139) according to one embodiment. In FIG. 4, each of the cells (131, . . . , 133, . . . , 139) represents a portion of the region (101). To determine whether the location (111) is within the boundary of the region (101), the system is configured to determine whether the set of cells (131, . . . , 133, . . . , 139) contains the location (111).

In one embodiment, to efficiently determine whether any of the cells (131, . . . , 133, . . . , 139) contains the location (111), each of the cells (131, . . . , 133, . . . , 139) is assigned a cell identifier. In one embodiment, each of the cell identifier is a signed integer for improved computation efficiency; and the cell identifier is configured in such a way that the coordinates of any location within the cell can be manipulated via a set of predetermined, computationally efficient rules to provide the same cell identifier, as further illustrated in FIGS. 12 and 13.

In FIG. 4, after the coordinates of the location (111) is converted to the cell identifier of the cell (133) that contains the location (111), the system determines whether the location (111) is within the region corresponding to the set of cells (131, . . . , 133, . . . , 139) by searching in the cell identifiers of the set of cells (131, . . . , 133, . . . , 139) representative of the region (101) to find a match to the cell identifier of the cell (133) that is converted from the coordinates of the location (111). If a match is found, the location (111) is determined to be within the region (101); otherwise, the location (111) is determined to be outside of the region (101).

Figure 5:
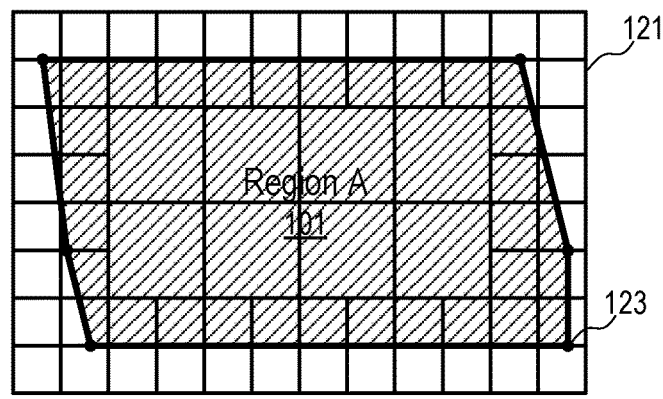
FIGS. 5-7 illustrate a hierarchical grid system used to determine whether a location of a mobile device is within the geographical boundary of a region according to one embodiment.
Figure 6:
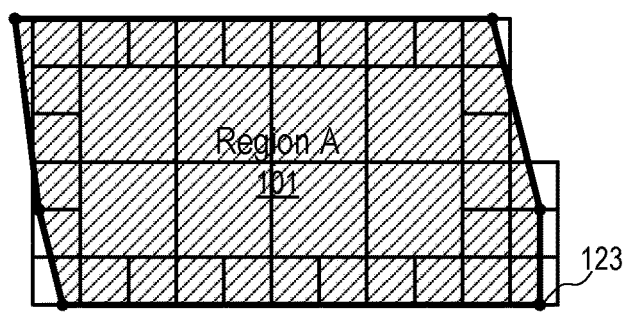
Figure 7:
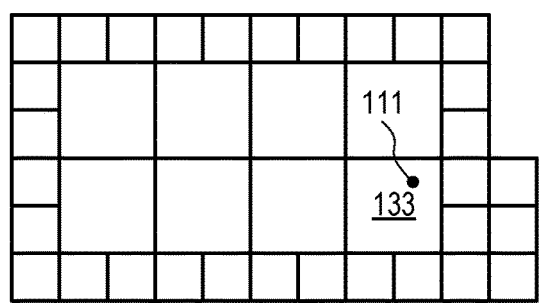

To improve the accuracy in the approximation of the region (101) and computational efficiency, the cells of a hierarchical grid system is used to approximate the region (101). FIGS. 5-7 illustrate a hierarchical grid system used to determine whether a location of a mobile device is within the geographical boundary of a region according to one embodiment.

In FIG. 5, grids of different resolutions are used to identify a set of cells to approximate the region (101). The grids has a predetermined hierarchy, in which the grid lines of a high level grid aligns with some of the grid lines of a low level grid such that the cells of the low level grid subdivide the cells of the high level grid. The grids of different resolutions have different cell sizes.

In general, a grid having a higher resolution and thus smaller cell size can approximate the region (101) in better precision, but uses more cells.

In one embodiment, the cells from the lower resolution grid is used in the interior of the region (101) to reduce the number of cells used; and the cells from the higher resolution grid is used near the boundary of the region (101) to improve precision in using the set of cells to approximately represent the region (101).

For example, in one embodiment, the lowest resolution gird is applied to identify a set of cells to approximate the region (101). The cells in the lowest resolution grid that contain the boundary of the region (101) are split in accordance with the grid of the next resolution level to identify cells in the grid of the next resolution level for improved precision in representing the region (101). The cell splitting process can be repeated for further improved precision using a higher resolution grid.

FIG. 6 illustrates the use of cells from two levels of hierarchical grids to approximate the region (101).

After the set of cells used to approximate the region (101) are identified (e.g., as illustrated FIG. 6), the system is configured to determine whether the location (111) of the mobile device (109) is within the region (101) based on whether any of the set of cells representing the region contains the location (111), in a way as illustrated in FIG. 7.

For example, in one embodiment, each of the cells used in FIG. 7 to represent a part of the region (101) is provided with a cell identifier. The coordinates of the location (111) is mapped to a cell identifier at a given resolution level. The system is configured to search in the set of cell identifiers of region (101) at the corresponding resolution level to determine whether there is a match to the cell identifier as determined from the coordinates of the location (111). If a match in cell identifier is found at any resolution level, the location (111) is determined to be within the region (101) represented by the set of cells; otherwise, the location (111) is determined to be outside the boundary of the region (101).

In one embodiment of FIG. 1, a hierarchical grid system is used to approximate the predefined regions (101, 103, . . . , 105, 106) with cells. Each of the cells is classified/identified as being in one or more of the regions (101, 103, . . . , 105, 106). The database (181) stores the identifiers of the cells in association with the identifies of the respective regions (101, 103, . . . , 105, 106); and the server (187) is configured to compute the identifiers of the cells of different resolutions that contain the location (111) and determine if any of the cell identifiers stored in the database (181) in association with the identifiers of the regions (101, 103, . . . , 105, 106) has the same cell identifier as the location (111). If a matching cell identifier is found, the location (111) of the mobile device (109) is determined to be with the respective region(s) (e.g., 101) associated with the corresponding cell identifier; otherwise, the location (111) is determined to be outside all of the regions (101, 103, . . . , 105, 106) represented by the set of cell identifiers stored in the database (181).

Figure 8:
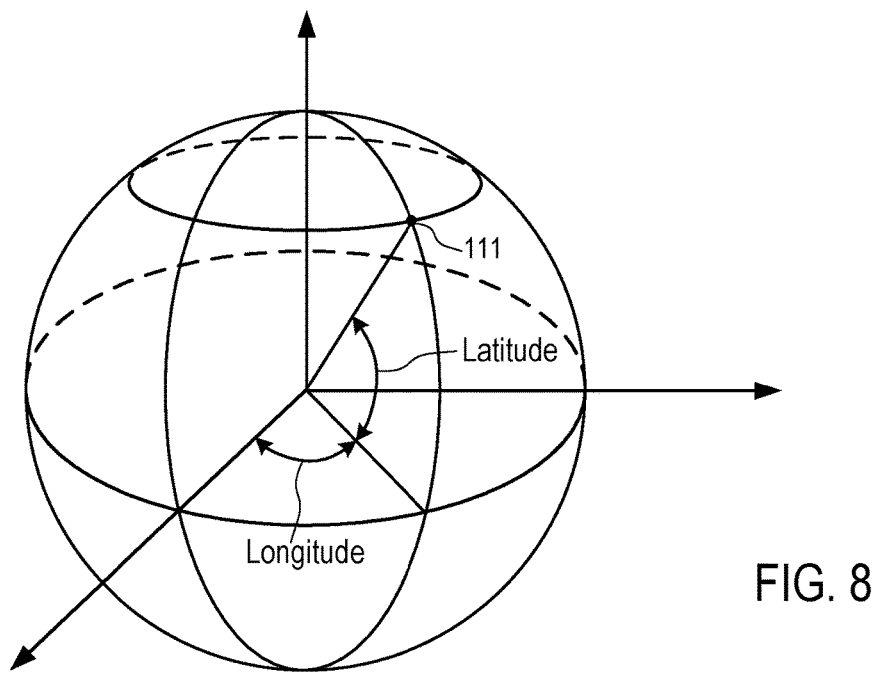
FIGS. 8 and 9 show a top level grid and the identification of cells within the grid according to one embodiment.
Figure 9:
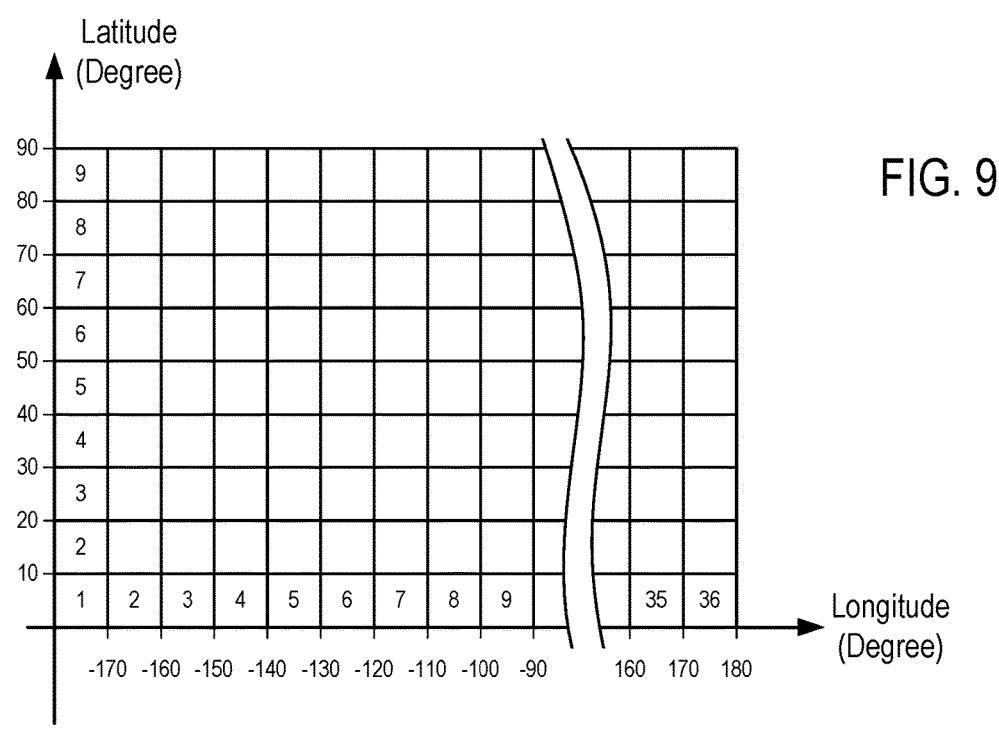

FIGS. 8 and 9 show a top level grid and the identification of cells within the grid according to one embodiment.

In one embodiment, the location (111) of the mobile device (109) is determined to be on the surface of the earth in terms of the longitude and latitude coordinates. In a coordinate system as illustrated in FIG. 8, the longitude coordinates are configured to be within the range of −180 degrees to 180 degrees; and the latitude coordinates are configured to be with the range of −90 degrees to 90 degrees.

In one embodiment, a hierarchical grid system on the surface of the earth is based on a regular grid in the longitude latitude space illustrated in FIG. 9.

In FIG. 9, the cells in the top level grid have a uniform size of 10 degrees in longitude and 10 degrees in latitude. In FIG. 9, the cells are identified by the row identifiers ranging from −9 to −1 and 1 to 9 and column identifiers ranging from 1 to 36.

In FIG. 9, the row and column identifiers are configured in a way to avoid using zero as a row identifier or a column identifier.

In FIG. 9, the row identifier of 1 is assigned to the row of cells between 0 to 10 degrees of latitude; the row identifier of 2 is assigned to the row of cells between 10 to 20 degrees of latitude; etc. The rows of cells between 0 to −90 degrees of latitudes are assigned similar row identifiers with a negative sign. For example, the row identifier of −1 is assigned to the row of cells between 0 to −10 degrees of latitude; the row identifier of −2 is assigned to the row of cells between −10 to −20 degrees of latitude; etc. As a result, the row identifier has a sign and a single digit for the top level cells illustrated in FIG. 9; and the single digit is not zero for any of the rows. Thus, for each location that is inside a cell in the top level grid as illustrated in FIG. 9, the row identifier of the cell containing the location has the same sign as the latitude coordinate of the location and the single digit that equals to 1 plus the tens digit of the latitude coordinate of the location.

In FIG. 9, the column identifier of 1 is assigned to the column of cells having longitude coordinates between −180 to −170 degrees; the column identifier of 2 is assigned to the column of cells having longitude coordinates between −170 to −160 degrees; etc. Thus, for each location that is inside a cell in the top level grid as illustrated in FIG. 9, the column identifier of the cell containing the location has no sign (e.g., the column identifier is always greater than zero) and one or two digits that correspond to adding 18 to a number formed by using the hundreds digit of the longitude as the tens digit and the tens digit of the longitude as the ones digit.

The combination of the row identifier and the column identifier of a cell uniquely identifies the cell within the top level grid as illustrated in FIG. 9. For example, the digits of the column identifier can be appended to the row identifier to generate a signed number that uniquely identifies the cell within the grid illustrated in FIG. 9. For a given cell identifier, the row identifier and the column identifier can be unambiguously deduced from the cell identifier itself, since the row identifier has a signal digit and a sign. The longitude and latitude coordinates of the vertexes of the cell can be computed from the row identifier and the column identifier.

Although FIG. 9 illustrates a preferred way to code the row identifiers and the column identifiers based on the longitude and latitude coordinates of the locations within the cells, alternative coding schemes can be used.

For example, the rows can be coded from 1 to 18 for latitudes from −90 degrees to 90 degrees; and the columns can be coded from 10 to 45 for longitudes from −180 degrees to 180 degrees. Thus, both the row and column identifiers are positive integers, while the column identifiers always have two digits.

For example, the rows can be coded from 11 to 28 for latitudes from −90 degrees to 90 degrees; and the columns can be coded from 11 to 46 for longitudes from −180 degrees to 180 degrees. Thus, both the row and column identifiers are positive integers having two digits.

Figure 10:
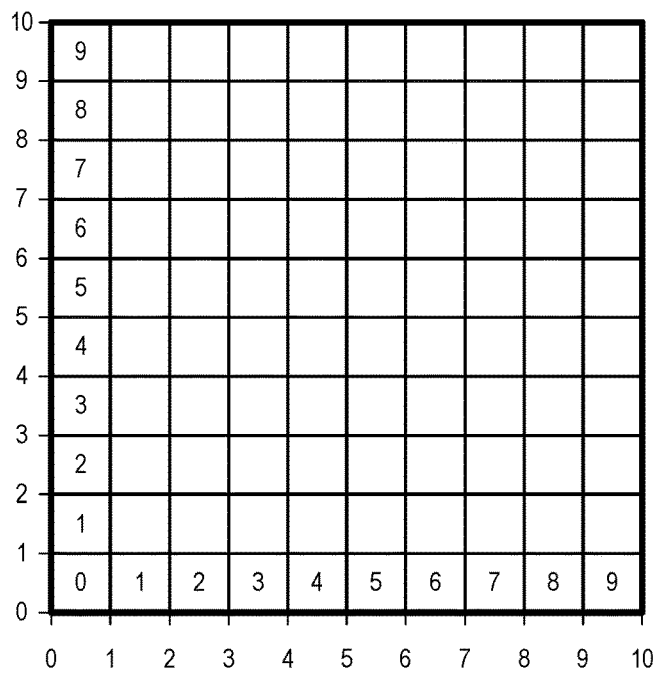
FIG. 10 shows an intermediate level grid and the identification of cells within the grid according to one embodiment.

FIG. 10 shows an intermediate level grid and the identification of cells within the grid according to one embodiment. In FIG. 10, a given cell at a higher level grid (e.g., a cell in the top level grid as illustrated in FIG. 9) is subdivided into 10 rows and 10 columns. The coding of the rows and columns correspond to the measurement directions of the longitude and latitudes coordinates such that the corresponding digits in the longitude and latitudes coordinates at a given precision level can be used directly as the row and column identifiers of the sub-cells within the cell at the higher level grid.

For example, when the cell that is being subdivided into the 10 rows and 10 columns has a size of 10 degrees in longitude and 10 degrees in latitude (e.g., as illustrated in FIG. 9), the row identifier and column identifier of the sub-cells correspond to the ones digit of the latitude and longitude coordinates of the points within the respective sub-cells.

For example, when the cell that is being subdivided into the 10 rows and 10 columns has a size of 1 degree in longitude and 1 degree in latitude, the row identifier and column identifier of the sub-cells correspond to the one-tens digit of the latitude and longitude coordinates of the points within the respective sub-cells.

Figure 11:
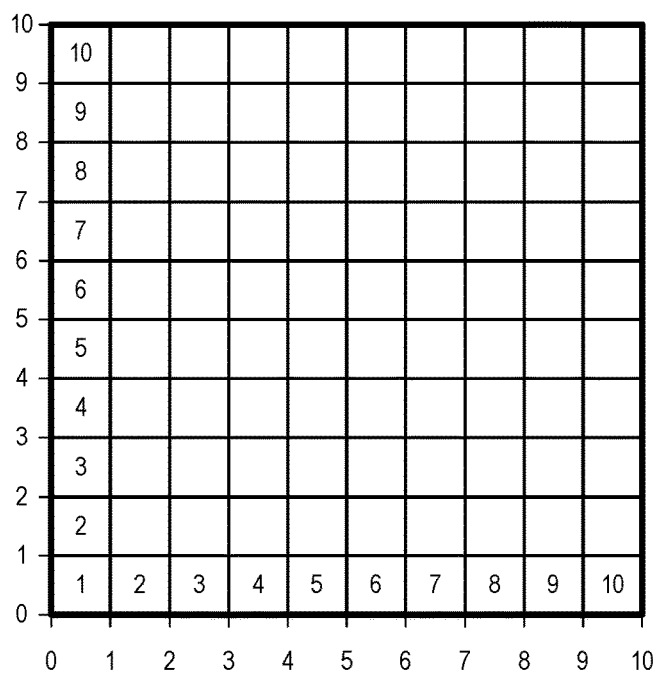
FIG. 11 shows the identification of cells within a grid having the finest resolution in a grid hierarchy according to one embodiment.

FIG. 11 shows the identification of cells within a grid having the finest resolution in a grid hierarchy according to one embodiment. In FIG. 11, the row identifiers and column identifiers are padded by 1, in comparison with the row and column coding scheme illustrated in FIG. 10.

In one embodiment, an identifier cell for a given resolution includes sufficient information to identify the corresponding cells in the higher level grid(s) that contains the cell. Thus, a cell identifier uniquely identifies a cell in the entire hierarchical grid without ambiguity.

Figure 12:
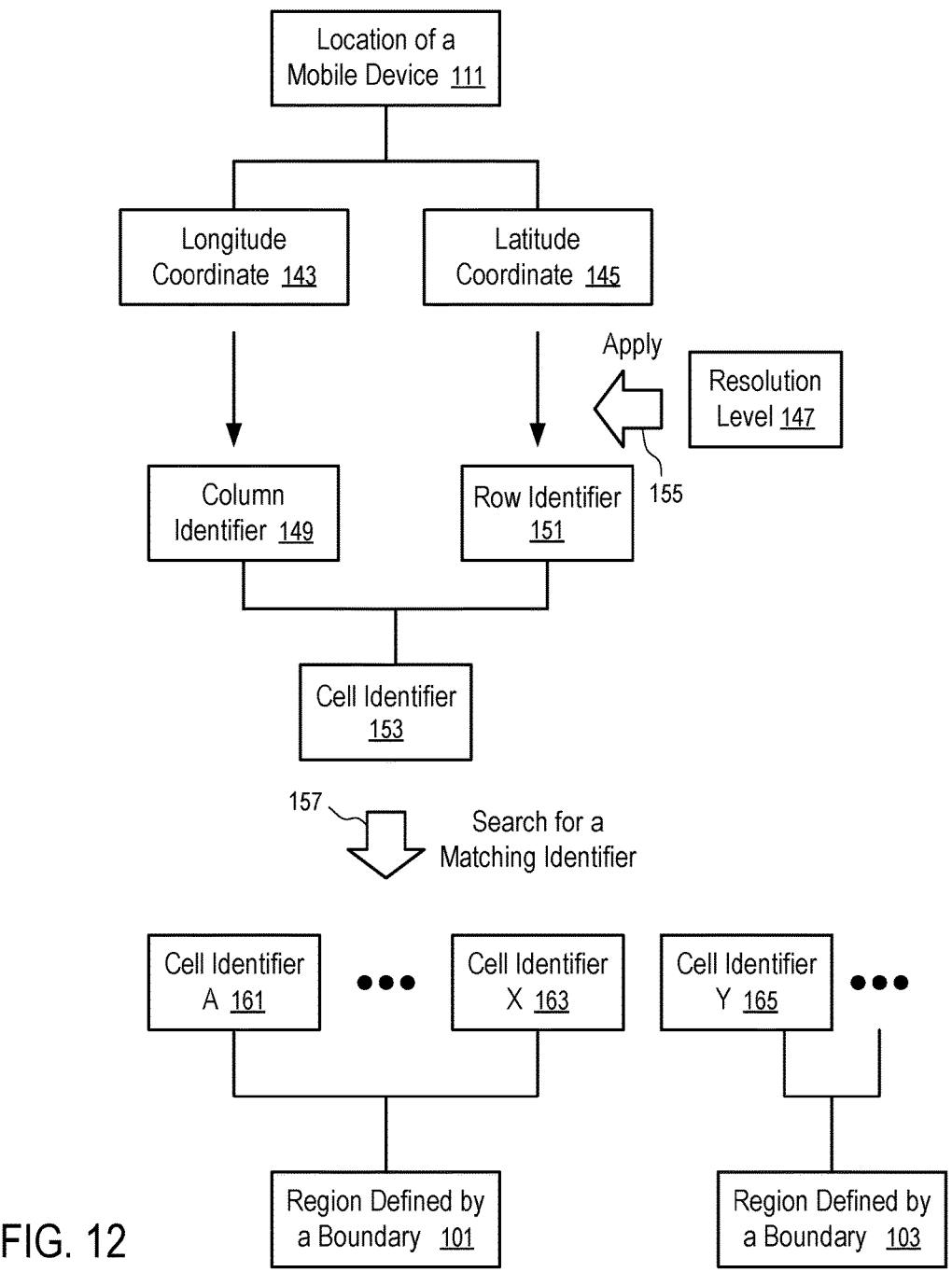
FIG. 12 shows the method to determine whether a location of a mobile device is within the geographical boundary of a region according to one embodiment.

FIG. 12 shows the method to determine whether a location of a mobile device is within the geographical boundary of a region according to one embodiment.

In FIG. 12, the location (111) of the mobile device (109) is determined in terms of the longitude coordinate (143) and the latitude coordinate (145).

For a given resolution level (147), the longitude coordinate (143) and the latitude coordinate (145) are truncated to generate the column identifier (149) and the row identifier (151). Applying (155) the resolution level (147) includes truncating the longitude coordinate (143) and the latitude coordinate (145) to the corresponding digits of precision to generate the column identifier (149) and the row identifier (151). In one embodiment, the digits corresponding to the top level grid and the bottom level grid at the given resolution are adjusted according to FIGS. 9 and 11.

In FIG. 12, the column identifier (149) and the row identifier (151) are combined to generate the cell identifier (153) of the location (111) of the mobile device at the given resolution level (147).

In one embodiment, the database (181) stores a set of cell identifiers (161, . . . , 163) that are associated with the region (101) defined by a predetermined boundary. The server (187) searches (157) the set of cell identifiers (161, . . . , 163) to find a match with the cell identifier (153). If a match is found, the location (111) of the mobile device (109) is determined to be within the boundary of the region (101).

In one embodiment, the database (181) stores a set of cell identifiers (e.g., 161, . . . , 163, 165, . . . ) associated with respective different regions (e.g., 101, 103, . . . ). When the cell identifier (153) of the location (111) of the mobile device (109) is found to be matching with a particular cell identifier (e.g., 163 or 165), the region (e.g., 101 or 103) associated with the particular cell identifier (e.g., 163 or 165) is determined to be the region in which the mobile device (141) is located.

In one embodiment, when a cell contains the boundary of two regions (e.g., 101 and 103), the cell identifier of the cell can be associated with both regions (e.g., 101 and 103). The system may optionally further determine which region the cell is in based on the coordinates of the vertexes defining the boundary (or other parameters that define the boundary between the regions).

FIG. 13 illustrates an example of converting the coordinates of a location to an identifier of a cell and converting the identifier of the cell to the coordinates of a vertex of the cell according to one embodiment.

In FIG. 13, the location has a latitude coordinate of −51.12345678 and a longitude coordinate of −41.12345678. A resolution at the fifth digit after the decimal point is applied to the coordinates to generate the truncated coordinates (−41.12345, −51.12345). The decimal point is removed to obtain the longitude digits −4112345 and the latitude digits −5112345. Since the length of the equator of the earth is about 40,075 km, the cell size near the equator is about 1.11 meters at the resolution corresponding to the fifth digit.

In accordance with the scheme for the top level grid illustrated in FIG. 9, the tens digit for the latitude coordinate is padded with one (without considering the sign of the latitude); and the hundreds digit and tens digit, including the sign, of the longitude coordinate is padded with 18 to generate the row identifier −6 and the column identifier 14 for the top level grid.

In accordance with FIG. 10, the row identifiers and column identifiers of the sub-cells in the hierarchical grid correspond to the respective latitude digits and longitude digits (1, 1, 2, 3, 4).

In accordance with FIG. 11, the row identifiers and column identifiers of the sub-cells in the bottom hierarchy is padded with 1, if the longitude and/or the latitude coordinates of the location is not exactly on the grid lines of the resolution level (e.g., if the longitude or latitude coordinate has nonzero digits after the fifth digit behind the decimal point). One is not padded at the last digit when the longitude and/or the latitude coordinates of the location is exactly on the grid lines of the resolution level (e.g., if the longitude or latitude coordinate has no nonzero digits after the fifth digit behind the decimal point). According to this padding scheme, in the northern hemisphere locations on the northern edge of a cell are included in the cell but not the locations on the southern edge. In the southern hemisphere, locations on the southern edge of a cell are included in the cell but not the locations on the northern edges. Locations on the eastern edge of a cell are included in the cell, but not the western edge.

Thus, the location (−41.12345678, −51.12345678) has the row and column identifiers −6112346 and 14112346. The digits of the column identifier are appended to the digits of the row identifier to generate the cell identifier −611234614112346.

In FIG. 13, the row and column identifiers can be recovered from the cell identifier. The number of digits in the cell identifier divided by 2 provides the number of leading digits for the row identifier; and the remaining digits are for the column identifier. From the row identifier and column identifiers, the latitude digits and longitude digits can be computed via subtraction of the respective padding. The truncated coordinates can be computed from the latitude digits and longitude digits respectively, which can be used to determine the coordinates of a vertex of the cell as (−41.12345, −51.12345). Based on the resolution of the cell being at 0.00001, the coordinates of other vertexes of the cell can be determined as (−41.12346, −51.12345), (−41.12346, −51.12344), (−41.12345, −51.12344). The bounding box of the cell and the neighboring cells can also be easily identified based on the coordinates.

FIG. 13 illustrates a way to append the digits of the column identifier to the digits of the row identifier to generate the cell identifier. Alternatively, the row identifier and the column identifier can be combined in other ways that can be reversed to derive the row identifier and the column identifier from the cell identifier.

For example, when the top level column identifiers are mapped to the range 11 to 46 to have a fixed number of two digits for the top level column, the column identifier is 2411236. Since there is no ambiguity in the number of digits used to represent the top level column, the top level column identifier (24) can be appended after the top level row identifier (−6), which is then appended with the row and column identifiers of the next level, and so on. Thus, a cell identifier of −6241111223366 can be generated, with the sign then the first three digits representing the top level row and column, and two digits for subsequent next level row and column to identifying the subdivision within the higher level cell.

In some embodiments, the row and column identifiers of the bottom level are not padded in a way illustrated in FIG. 11 to have different ways to account for the locations on grid lines at the lowest level resolution.

FIGS. 9-11 and 13 illustrate a grid hierarchy based on a decimal representation of longitude and latitude coordinates. Alternatively, the grid hierarchy can be constructed in accordance with longitude and latitude coordinates expressed using other bases, such as binary, ternary, quintal, octal, duodecimal, etc. in a similar way.

Further, in some embodiments, the longitude and latitude coordinates may be normalized (e.g., in the standardized data range between 0 to 1); and the grids can be constructed in the space of the normalized longitude and latitude coordinates.

The hierarchical grid can also be extended to a three-dimensional space. For example, a hierarchical grid can be constructed with regular grids in the longitude, latitude, altitude space, or in a mapped or normalized longitude, latitude, and altitude space.

Figure 14:
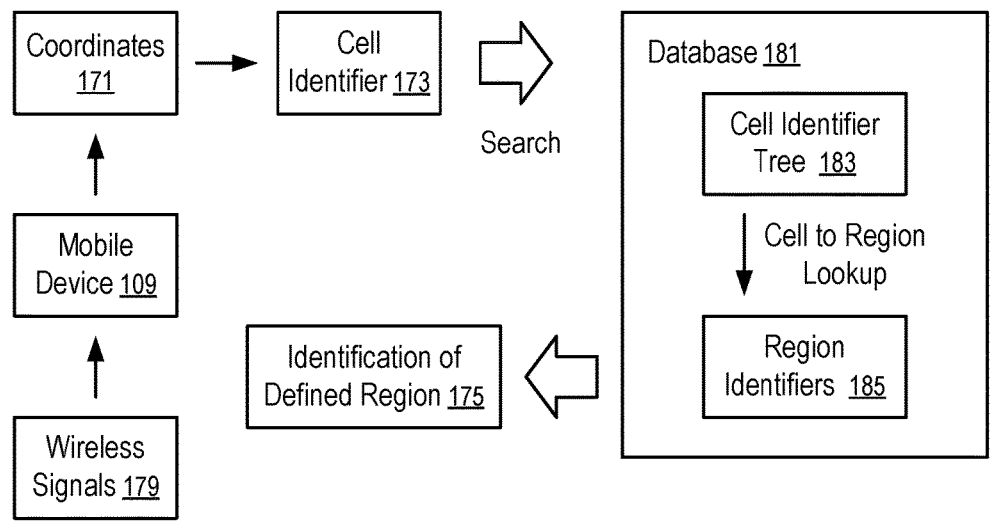
FIG. 14 shows a system configured to map a location of a mobile device to one or more identifications of regions according to one embodiment.

FIG. 14 shows a system configured to map a location of a mobile device to one or more identifications of regions according to one embodiment. In FIG. 14, the mobile device (109) determines the coordinates (171) of its location (111) based on the wireless signals (179) to and/or from a location determination system, such as the Global Positioning System (GPS).

The coordinates (171) are converted to a cell identifier (173) of a cell that contains the location, e.g., in a way as illustrated in FIG. 12 or 13.

In the database (181), a set of cell identifiers are stored in association with region identifiers (185), where each of the cell identifiers is associated with one or more of the respective regions when the respective cell contains at least a portion of the one or more of the respective regions.

In one embodiment, the set of cell identifiers are organized as a cell identifier tree (183) to facilitate the search of a matching identifier.

For example, the cell identifier tree (183) can be constructed as a self-balancing tree for efficient searching of a cell identifier matching the cell identifier (173) generated from the coordinates (171) of the mobile device (109).

In general, any methods to search for an identifier with a set of predetermined identifiers can be used to search for the matching cell identifier (173).

From the association of the cells with the region identifiers (185) in the database, the server (187) determines the identification (175) of the one or more defined regions that are at least partially in the cell identified by the cell identifier (173). Thus, the location (111) of the mobile device (109) is determined to be within the region(s) identified by the identification (175) of the defined region(s).

Similarly, after regions of different sizes and locations are represented via the cells in the hierarchical grid, the system can be configured to efficiently compute overlapping portions of regions via searching for cells having the same identifications.

For example, to determine the approximate overlapping between regions, the percentage of overlapping, the square of overlap, etc., the system is configured to count a number of overlapped cells to determine the overlapping.

In one embodiment, a polygon or any other shape is approximated by a set of rectangular and/or square cell of different sizes in a suitable coordinate system (e.g., in longitude latitude space). Each cell is represented by a single number as identifier. The identifiers of the cells used to approximate the polygon or shape can be organized as a binary tree, a self-balanced tree, a Red/Black Tree, or other structures that are known to provide logarithmic search time to improve the computation efficiency in determining whether a point is within the polygon or shape.

For example, a polygon representing the boundary of United States of America USA on a map may include 2,000 vertexes. The Ray Casting algorithm has O(n) complexity to calculate if a point is within the polygon. When this polygon is approximated via a hierarchical grid system discussed above, the polygon can be represented 700 to 2,000,000 cells in the longitude latitude space, depending on the required precision. When the polygon is represented by 2,000,000 cells and their corresponding identification numbers, searching a matching identifier at the same precision via a binary tree gives log(2,000,000)=21 complexity, which is much less than 2,000. Thus, the present disclosure improves the computational efficiency of identifying a region in which a mobile device is located.

Figure 16:
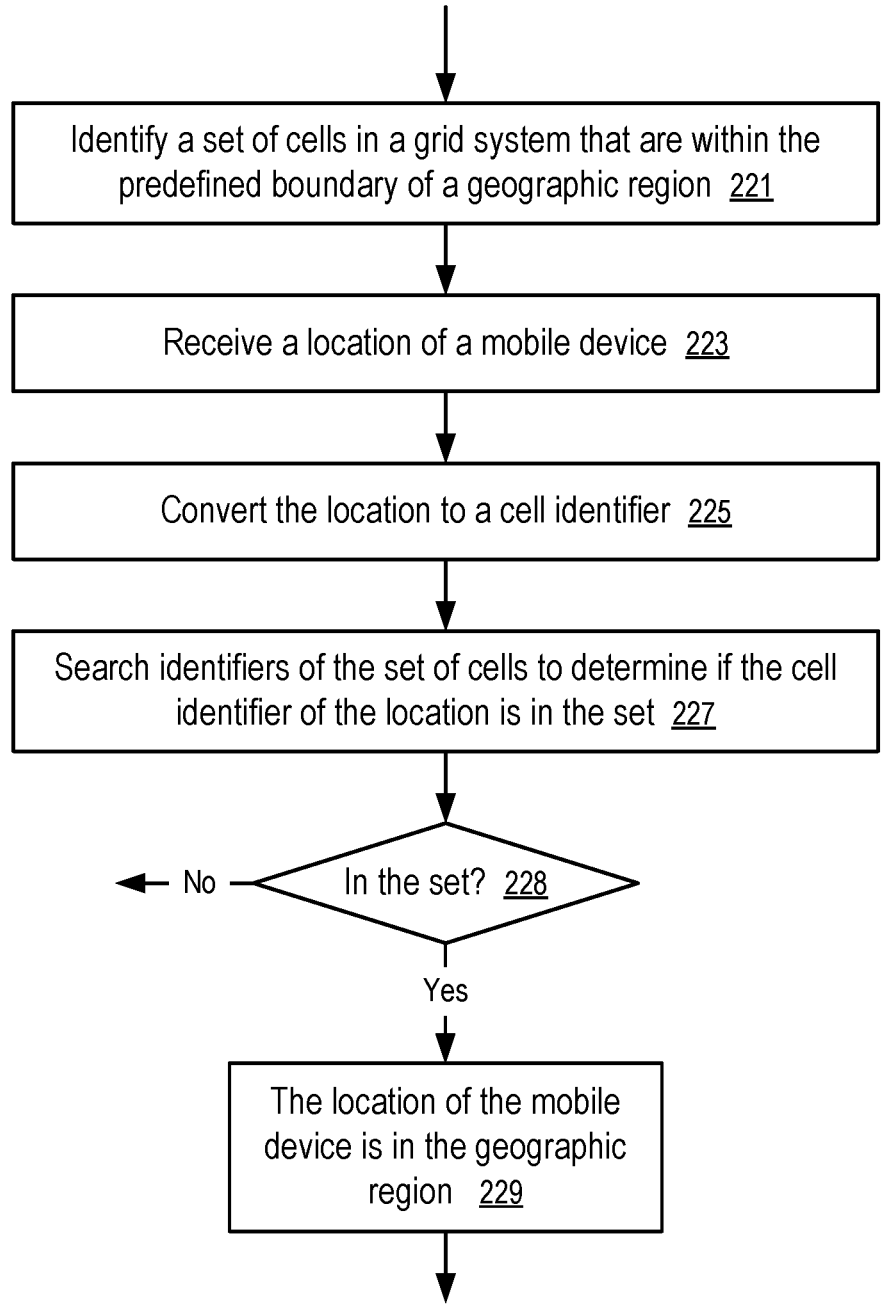
FIG. 16 shows a method of mapping a location of a mobile device to a region according to one embodiment.

FIG. 16 shows a method of mapping a location of a mobile device to a region according to one embodiment. For example, the method of FIG. 16 can be implemented in the system of FIG. 1 and/or FIG. 14, using the grid system illustrated FIGS. 2-8, and/or the grid system and cell identifier system illustrated in FIGS. 8-13.

In FIG. 16, a computing apparatus is configured to: identify (221) a set of cells in a grid system that are within the predefined boundary of a geographic region; receive (223) a location (111) of a mobile device (109); convert (225) the location (111) to the identifier of a cell that contains the location; and search (227) identifiers of the set of cells to determine if the cell identifier of the location (111) is in the set. If it is determined (228) that the cell identifier of the location (111) is in the set, the computing apparatus determines (229) that the location (111) of the mobile device (109) is in the geographic region.

In one embodiment, the computing apparatus includes at least one of: the database (181) and the server (187).

In one embodiment, the database (181) is configured to store an identifier of a geographical region (101) having a predefined geographical boundary defined by a set of vertexes (e.g., 123) or a set of other parameters, such as a center location and a radius.

The database (181) further stores a set of cell identifiers, each of which identifies a cell that is determined to be within the predefined geographical boundary of the geographical region (101).

After the server (187) receives, from a mobile device (109), a location (111) of the mobile device (109), the server (187) converts a set of coordinates (143, 145) of the location (111) of the mobile device (109) to a cell identifier (153) of a cell that contains the location (111). In some embodiments, the mobile device (109) generates the cell identifier (153) at a desired precision level to represent the location (111) of the mobile device (109).

The server (187) determines whether the location (111) of the mobile device (109) is within the geographical region (101) based on searching the set of cell identifiers to determine if the set has the cell identifier (153) computed from the coordinates (143, 145) of the location (111) of the mobile device (109).

In one embodiment, to convert the set of coordinates (143, 145) of the location (143, 145) to the cell identifier (153), the server (187) (or the mobile device (109)) generates two integers from longitude and latitude coordinates of the location (111) of the mobile device (109) according to a precision level (e.g., resolution level (147), and combine the two integers into the first cell identifier (153) without using a floating point number computation.

In one embodiment, each cell using the in the system to approximate the regions and the locations is a rectangle/square area in a longitude latitude space of locations on the earth. The size of the cell can be unambiguously determined from the cell identifier itself. Further, the longitude and latitude coordinates of corners of the cell identified by the cell identifier can be unambiguously determined from the cell identifier itself.

In one embodiment, the set of cells identified by the set of cell identifiers to approximate one or more regions (e.g., 101, 103, . . . , 105, . . . , 107) has a plurality of different cell sizes that correspond to a plurality of predetermined cell resolution levels. Each of the plurality of predetermined cell resolution levels corresponds to a predetermined precision level of longitudes and latitudes of locations on the earth. For example, each of the plurality of predetermined cell resolution levels corresponds to a precision to a predetermined digit after the decimal point in longitude and latitude coordinates of locations on the earth.

In one embodiment, a cell identifier itself includes sufficient information to determine the resolution level of the cell, the coordinates of the vertexes of the cell, and the identifiers of the neighboring cells, etc.

In one embodiment, the database (181) stores data mapping each cell identify in the set of cell identifiers to at least one region identifier, where the cell contains a least a part of each of the regions identified by the at least one region identifier. The server (187) is configured to search the set of cell identifiers to find a cell identifier that matches with the cell identifier (153) computed from the location (141) and thus determine at least one region identifier associated with the matching cell identifier.

For example, in one embodiment, the set of coordinates of the location (111) includes longitude (143) and latitude (145) of the location (111). To converting the coordinates (143, 145) to the cell identifier (153), the server (187) (or the mobile device (109)) selects digits from the longitude (143) and the latitude (145) of the location (111) in accordance with a cell resolution level (147) and combines the digits selected from the longitude (143) and the latitude (145) of the location (111) into an integer representing the cell identifier (153) of the location (111).

As illustrated in FIG. 13, selecting the digits from the longitude and the latitude includes: selecting digits from integer part of the longitude and a first number of digits from the longitude after the decimal point of the longitude to form an integer representation of the longitude at the cell resolution level; and selecting digits from integer part of the latitude and the same first number of digits from the latitude after the decimal point of the latitude to form an integer representation of the longitude at the cell resolution level.

In one embodiment, to generate the column identifier and row identifier of the location (111), a predetermined number (e.g., one) is added to a digit of the integer representation of the latitude that corresponds to the tens digit of the latitude; and a sign is provided to the integer representation of the latitude according to the sign of the latitude.

In one embodiment, after providing a sign to the integer representation of the longitude according to the sign of the longitude, a predetermined number (e.g., eighteen) is added to digits of the integer representation of the longitude that corresponds to the hundreds digit and tens digit of the longitude, in view of the sign provided to the integer representation of the longitude.

In one embodiment, when the latitude coordinate has a non-zero portion that is discarded during the selection of the latitude digits for the integer representation of the latitude, one is added to the ones digit of the integer representation of the latitude without considering the sign of the integer representation of the latitude. When the longitude coordinate has a non-zero portion that is discarded during the selection of the longitude digits for the integer representation, one is added to the ones digit of the integer representation of the longitude without considering the sign of the integer representation of the longitude.

In one embodiment, after the server (187) receives data representing the predefined geographical boundary of the geographical region, such as the coordinates of the vertexes of a region having a polygon shape, the coordinates of the center and the radius of a region having a circular shape, etc., the server (187) identify, in a hierarchy of cell grids, the set of cell identifiers that are determined to be within the predefined geographical boundary.

In one embodiment, when the set of cells being searched having different resolutions (cell sizes), the location (111) of the mobile device (109) is converted to a plurality of cell identifiers at the corresponding resolutions; and the server (187) is configured to search a match of any of the cell identifiers at the corresponding resolutions computed from the location (111) of the mobile device (109).

For example, the identifiers of the cells of different sizes/resolutions to represent the regions can be organized in a single tree; and the identifiers of the location (111) of the mobile device (109) of corresponding sizes/resolutions can be searched concurrently or one after another to find a match.

For example, the identifiers of the cells of different sizes/resolutions to represent the regions can be organized in separate trees according to cell sizes/resolutions; and the identifiers of the location (111) of the mobile device (109) of corresponding sizes/resolutions can be searched concurrently or one after another in the respective trees for corresponding sizes/resolutions.

In one embodiment, each grid in the hierarchy of cell grids corresponds to a rectangle/square grid in longitude latitude space of locations on the earth with a predetermined resolution level that corresponds to a precision level in a floating point decimal representation of longitude and latitude coordinates.

Figure 17:
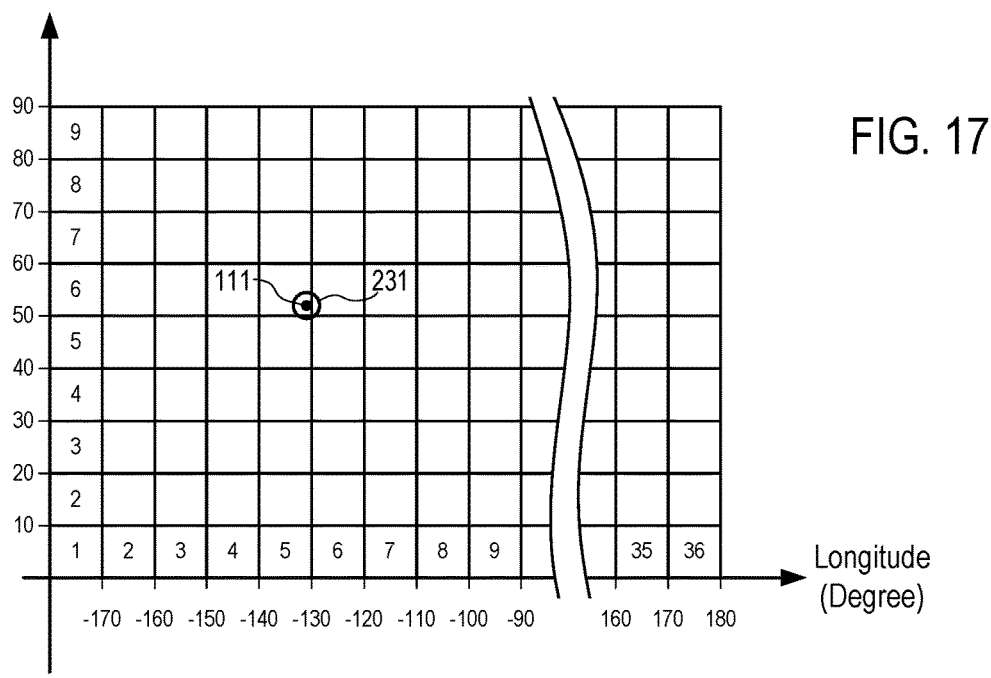
FIG. 17 illustrates the measurement of the location of the mobile device with a level of uncertainty.

FIG. 17 illustrates the measurement of the location of the mobile device with a level of uncertainty.

As illustrated in FIG. 17, the measurement of the location (111) of a mobile device (109) may be represented by a set of coordinates (e.g., 143, 145) of a point (111) that is considered to be the most likely candidate of the location (111) of the mobile device (109) and a level of accuracy or uncertainty in the measurement.

The level of accuracy of the location measurement indicates that the actual location of the mobile device (109) is within an area (231) that contains the point (111) identified by the set of coordinates (e.g., 143, 145). Any point within area (231) has a probability of being the actual location (111) of the mobile device (109); and the probability of the actual location of the mobile device (109) being outside the area is considered negligible.

The level of accuracy of the location measurement may be identified via a radius of the area (231) for the point (111) specified by the set of coordinates (e.g., when the accuracy of the measurement is non-directional in the space).

In some instances, the measured coordinates (e.g., 143, 145) may have different accuracy levels in different measurement directions in the space (e.g., longitudinal direction, latitudinal direction, and/or altitudinal direction).

The possible area (231) of the actual location of the mobile device (109) may be constructed as a circular, elliptical, square, or rectangle area in a two dimensional location measurement space, or a spherical, ellipsoidal, cube, or rectangular cuboid in a three dimensional location measurement space.

A distribution of probability of the actual location of the mobile device (109) being at a point within the area can be constructed by fitting a predetermined distribution function on the area (231), where the distribution function identifies the largest probability at the point (111) specified by the set of coordinates (e.g., 143, 145) and diminished probabilities at or near the boundary of the area (231) and outside of the area (231).

The measurement of the location (111) of the mobile device (109) can be obtained via a position determination system (e.g., illustrated in FIG. 1) in which the mobile device (109) receives signals from, and/or transmits signals to, transmitters/receivers positioned at reference locations in the space.

For example, the position determination system may be a satellite positioning system using signals (179) from satellites (e.g., 117) to compute the coordinates of the location (111) of the mobile device (109) with an estimated accuracy. For example, the satellite positioning system may be a GPS, GLONASS, Galileo, Beidou, IRNSS, or QZSS system.

For example, the position determination system may be a cellular positioning system using signals to or from base stations (e.g., 113) to compute the coordinates of the location (111) of the mobile device (109) with an estimated accuracy.

When the possible area (231) of the actual location of the mobile device (109) is large (e.g., relative to the resolution of boundary representation of a predefined geographical region), it is insufficient to conclude with a sufficient confidence level as to whether the actual location of the mobile device (109) is within the geographical region based solely on a determination of whether the most likely point (111) of the actual location of the mobile device (109) is in the geographical region.

To evaluate the confidence level of a determination as to whether or not the actual location of the mobile device (109) is within the geographical region, a plurality of sample points in the possible area (231), including the point (111) specified by the set coordinates provided in the location measurement, can be selected for a determination of whether the sample points are within the predefined boundary of the geographical region. When a subset of the sample points are found to be within the predefined boundary of the geographical region, the confidence level of the actual location of the mobile device (109) is within the geographical region can be evaluated based on a set of predetermined weights assigned to the sample points that are determined to be within the predefined boundary of the geographical region.

Figure 18:
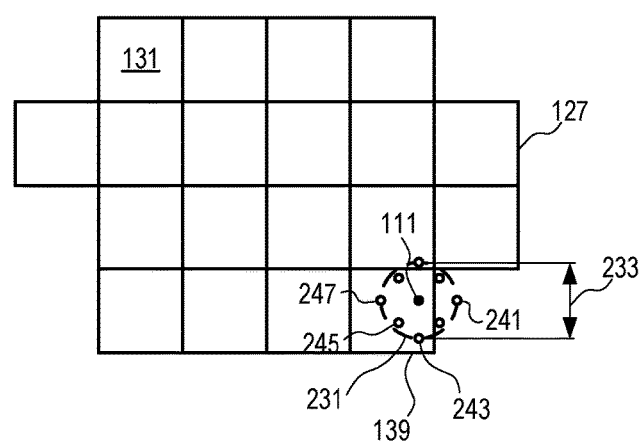
FIG. 18 illustrates a method to compute the confidence level of a mobile device being in a region having a predefined geographical boundary.

FIG. 18 illustrates a method to compute the confidence level of a mobile device being in a region having a predefined geographical boundary.

FIG. 18 shows a set of sample points (e.g., 111, 241, 243, 245, and 247) that are located within the area (231) specified by the coordinates of the most likely point (111) of the location of the mobile device (109) and the accuracy level of the measurement of the coordinates of the most likely point (111). The sample points (e.g., 111, 241, 243, 245, and 247) are shown in FIG. 18 in relation with a set of cells (e.g., 127) that are used represent a region (101) having a predefined geographical boundary according to a selected resolution level. The smallest size of the cells (e.g., 127) correspond the resolution level at which the collection of cells (e.g., 127) approximates the region (101) that is defined by its geographical boundary.

Although FIG. 18 illustrates an example in which a set of cells (e.g., 127) having the same cell size is used to approximate the region, a hierarchical cells (e.g., illustrated in FIG. 7) having different cell sizes can be used to reduce the number of cells in representing the region without reducing resolution.

In FIG. 18, some of the sample points (e.g., 241, 243, 247) are located on the boundary of the area (231) specified by the coordinates of the most likely point (111) of the location of the mobile device (109) and the accuracy level of the measurement of the coordinates of the most likely point (111); and some of the sample points are located inside the area (e.g., 111, 245). In general, it is not necessary to select the sample points (e.g., 241, 243, 247) from the boundary of the area (231).

Each of the sample points (e.g., 241, 243, 245, 247) can be separately determined as to whether not the sample point is inside or outside of the geographical region, based on whether or not a cell identifier converted from the coordinates of the sample point matches with a cell identifier of the set of cells (e.g., 127) that collectively represent the region (e.g., using the techniques discussed in connection with FIGS. 1-16).

Each of the sample points (e.g., 111, 241, 243, 245, 247) is provided a weight based on the probability distribution of a portion of the area that is in the vicinity of a sample point and thus is controlled by the corresponding sample point. The probability distribution of the portion of the area (231) indicates the probability that the actual location of the mobile device (109) is in the portion of the area (231).

The sum of the weights assigned to the sample points (e.g., 111, 243, 245, 247) located within the set of cells (e.g., 127) corresponds the probability that the actual location of the mobile device (109) is in the portions of the areas controlled by the sample points located within the region (101) represented by the set of cells (e.g., 127). Thus, the sum of the weights represents the confidence level that the actual location of the mobile device (109) is the region; and the sum of the weights assigned to the sample points (e.g., 241) located outside of the set of cells (e.g., 127) represents the confidence level that the actual location of the mobile device (109) is outside of the region.

Increasing the number of sample points used in evaluating the confidence level of a determination of whether the actual location of the mobile device (109) is inside or outside of the region (101) can increase the accuracy in the determination of the confidence level but with an increased computation cost.

Preferably, the number of sample points and their distribution are selected based on the size (233) of the area (231) relative to the resolution of the cells (e.g., 139) near the area (231). The quantity and distribution of sample points can be selected to match the resolution of the one or more cells that contain the point (111) and/or other sample points. An iterative process can be used to add sample points based on the cell sizes that contain the already added sample points.

For example, when the point (111) is determined to be within the cell (139), the size of the cell (139) can be compared to the size of the area (233) to determine whether sample points are required (e.g., whether the size ratio is above a threshold); and if so, sample points (e.g., 241, 243, 247) can be added on the boundary of the area (231); and additional sample points (e.g., 245) can be added to match with the cell resolution of the point (111) and/or other sample points (e.g., 243, 247) (e.g., adding more sample points to reduce the ratio between the size(s) of the cell(s) in which the sample points are located and the distance(s) among the sample points to below a threshold).

Preferably, the locations of the sample points relative to the center point (111) and the boundary of the area (243), as well as their weights are predetermined. Thus, the coordinates of the sample points can be computed by scaling the offsets of the sample points from the center point according to the size (233) of the area (231).

Figure 19:
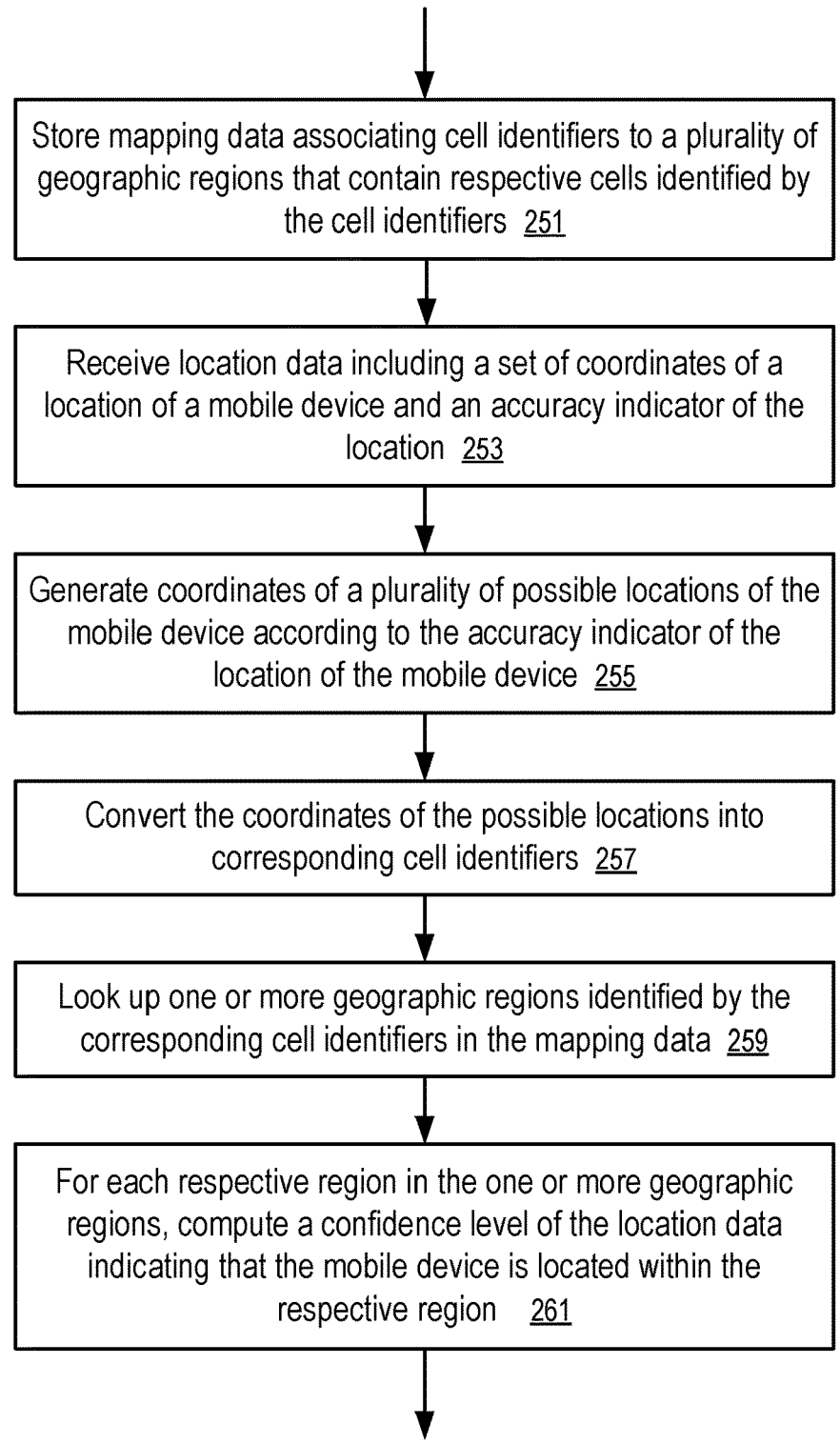
FIG. 19 shows a method to identify regions with corresponding confidence levels of a mobile device being in the respective regions.

FIG. 19 shows a method to identify regions with corresponding confidence levels of a mobile device being in the respective regions.

For example, the method of FIG. 19 can be implemented in a system illustrated in FIG. 1 using sample points illustrated in FIG. 18, where the determination of whether any of the sample point is within or outside of a region can be performed using the techniques illustrated in FIG. 12 where the coordinates of the sample point are converted into a cell identifier for a match in cell identifiers associated with the region.

In FIG. 19, the method includes: storing (251) mapping data associating cell identifiers (161, . . . , 163, 165, . . . ) to a plurality of geographic regions (101, 103, . . . ) that contain respective cells identified by the cell identifiers in a grid reference system (e.g., illustrated in FIGS. 2-11); and receiving (253) location data including a set of coordinates (e.g., 143, 145) of a location (111) of a mobile device (109) and an accuracy indicator (231) of the location (111).

The method further includes: generating (255) coordinates of a plurality of possible locations (e.g., 111, 241, 243, 245, 247) of the mobile device according to the accuracy indicator (231) of the location of the mobile device (109); converting (257) the coordinates (e.g., 143, 145) of the possible locations (e.g., 111, 241, 243, 245, 247) into corresponding cell identifiers (e.g., 153); and looking (259) up one or more geographic regions identified by the corresponding matching cell identifiers (161, . . . , 163, 165, . . . ) in the mapping data (e.g., using the technique illustrated in FIG. 12 or 14).

For each respective region in the one or more geographic regions that contain any of the possible locations, the method further includes computing (261) a confidence level of the location data indicating that the mobile device (109) is located within the respective region, based on the weight of the possible locations in the respective region.

When cells from a hierarchy of grids of different resolutions are used to represent a region, a coarse level cell containing fine level cells has a cell identifier that matches a portion of each of the identifiers of the fine level cells. The match indicates that the coarse level cell containing the fine level cells. Thus, the search for a match to a fine level cell identifier converted from the coordinates of a sample point (e.g., 111, 241, 243, 245, 247) can be used to identify a coarse or fine level cell that contains the same point (e.g., 111, 241, 243, 245, 247).

When a confidence level of the location data indicating that the mobile device (109) is located within a particular respective region is above a threshold, the mobile device (109) is identified as being located within the particular respective region as a result of the location data. Preferably, the threshold is selected such that mobile device (109) cannot be considered to be located within two non-overlapping regions according to the same location data, even though both regions may contain different portions of the sample points (e.g., when the area (231) is at the boundary between the regions and partially in the each of the regions).

In some instances, a mobile device (109) may report its location as a set of coordinates of the most likely point (111) without providing an accuracy indicator. A predictive model is used to estimate the accuracy level of the coordinates based on characteristics of the mobile device (109) and the characteristics of the signal environment of the point (111).

Figure 20:
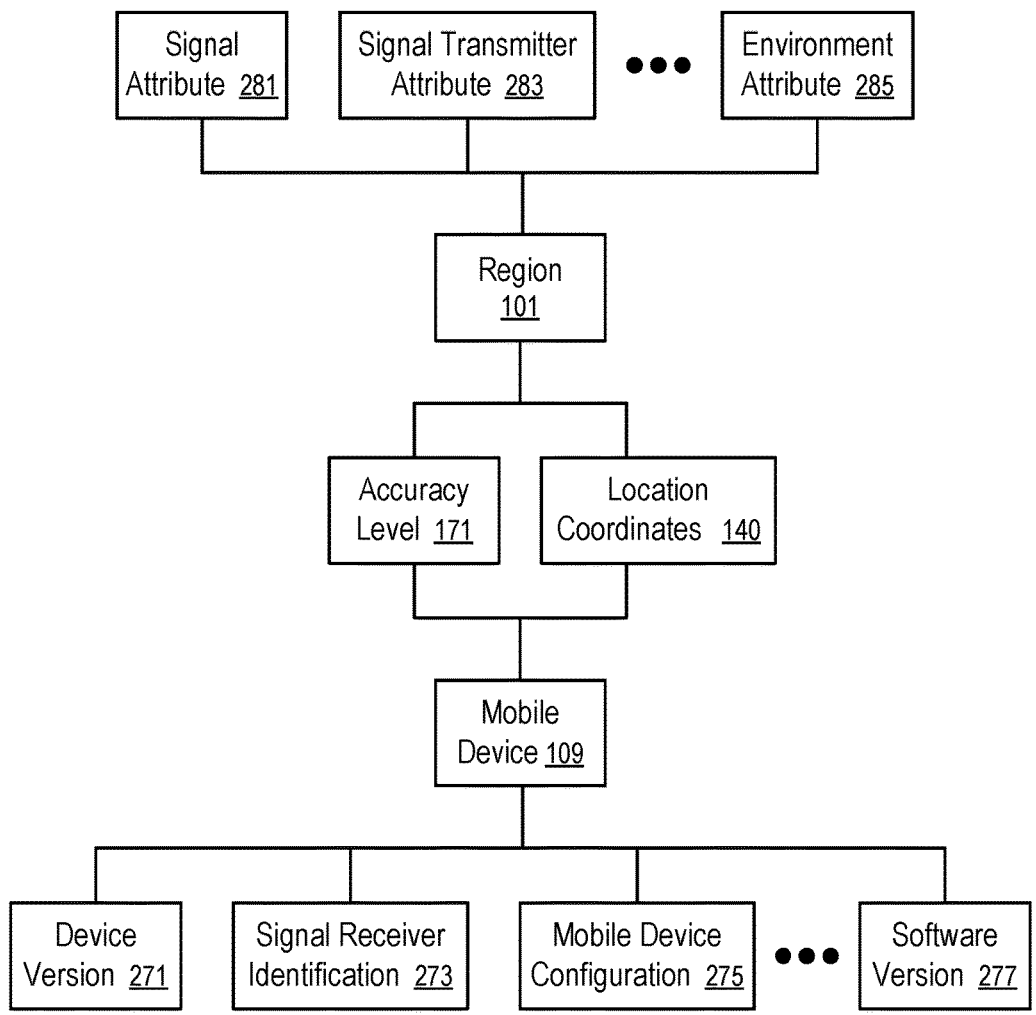
FIG. 20 illustrates region attributes and device attributes for the estimation of the accuracy level of coordinates of a location.

FIG. 20 illustrates region attributes and device attributes for the estimation of the accuracy level of coordinates of a location. The region attributes and device attributes related to the accuracy of location determination can be used in a statistical predictive model to estimate accuracy level of the coordinates reported by a mobile device.

In FIG. 20, the accuracy level (171) of a set of location coordinates (140) of a mobile device (109) relates to the device attributes of the mobile device (109), such as device version (271), the identification (273) of the receiver of signals used for location determination (e.g., GPS receiver), the configuration (275) of the mobile device (109) (e.g., how the receiver and/or antenna is configured on the mobile device (109)), software version (277) of computation algorithms for processing the location determination signals to generate the coordinates, etc. The device attributes have impact on the accuracy level (171) and/or are indicative of factors that have impact on the accuracy level (171).

In FIG. 20, the accuracy level (171) of the set of location coordinates (140) of the mobile device (109) also relates to the region attributes of the region (101) that contains the coordinates (140) of the mobile device (109), such as the attribute (281) of location determination signals available in the region (101), the attribute (283) of signal transmitters that transmit the location determination signals (e.g., GPS signals (179), cellular signals), the attribute (285) of the environment in the region (101) that has impact on the reception of location determination signals (e.g., whether the region is a high rise urban environment or an area under tree cover), etc. The region attributes have impact on the accuracy level (171) and/or are indicative of factors that have impact on the accuracy level (171).

A predictive model can be trained, using any statistical method known in the field in general, using location data reported by a population of mobile devices that report not only the coordinates of their locations but also the accuracy levels of the reported coordinates. The statistical training determines the parameters of the predictive model in making predictions to best match the reported accuracy levels of the mobile devices and the predicted accuracy levels that are predicted based on the region attributes of the reported locations and the device attributes of the mobile devices reporting the locations.

In some implementations, machine learning techniques can be used to train and/or improve a predictive model.

After the parameters of the predictive model are determined from the training data set, the predictive model can be used to estimate an accuracy level (171) when a mobile device (109) reports its coordinates (140) without the accuracy level (171). The coordinates (140) can be used to identify the region (101) that contains the coordinates (140) of the mobile device (109) and determine the attributes (281, 283, . . . , 285) of the region (101). The mobile device (109) reports its device attributes (271, 273, 275, . . . , 277). Applying the device attributes (271, 273, 275, . . . , 277) and the region attributes (281, 283, . . . , 285) in the predictive model provides an estimate of the accuracy level (171), which can be used determine the confidence level as to whether the actual location of the mobile device (109) is within a predetermined boundary of a particular region (e.g., 127).

Figure 21:
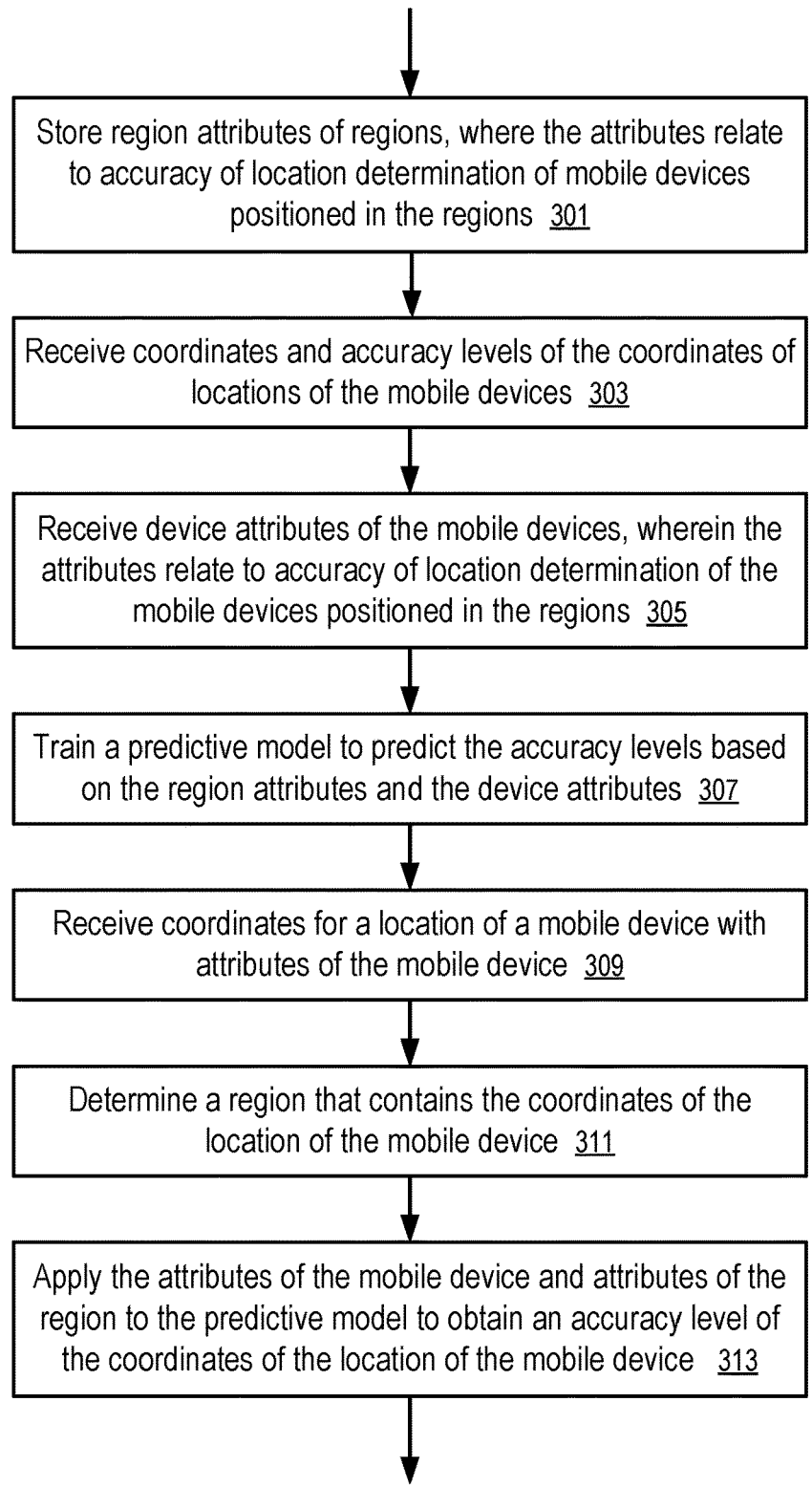
FIG. 21 shows a method to evaluate the accuracy level of coordinates of a location using a predictive model.

FIG. 21 shows a method to evaluate the accuracy level of coordinates of a location using a predictive model.

For example, the method of FIG. 21 can be implemented in a system of FIG. 1 using a predictive model discussed above in connection with FIG. 20.

In FIG. 21, the method includes: storing (301) region attributes (281, 283, . . . , 285) of regions (e.g., 101), where the attributes (281, 283, . . . , 285) relate to accuracy of location determination of mobile devices (e.g., 109) positioned in the regions (e.g., 101).

After receiving (303) coordinates (e.g., 140) and accuracy levels (171) of the coordinates (e.g., 140) of locations (e.g., 111) of the mobile devices (e.g., 109) and receiving (305) device attributes (271, 273, 275, . . . , 277) of the mobile devices (e.g., 109) that relate to accuracy of location determination of the mobile devices (e.g., 109) positioned in the regions (e.g., 101), the method includes training (307) a predictive model to predict the accuracy levels (e.g., 171) based on the region attributes (281, 283, . . . , 285) and the device attributes (271, 273, 275, . . . , 277).

The training (307) adjusts the parameters of the predictive model to minimize the difference between the accuracy levels (e.g., 171) obtained with the location coordinates (e.g., 140) and the accuracy level computed from the predictive model using the respective device attributes (271, 273, 275, . . . , 277) of mobile devices (e.g., 109) reporting the respective coordinates (e.g., 140) and the respective region attributes (281, 283, . . . , 285) of the respective regions (e.g., 101) in which the respective coordinates (e.g., 140) are located.

Subsequently, in response to receiving (309) coordinates (140) for a location (101) of a mobile device (109) with attributes (271, 273, 275, . . . , 277) of the mobile device (109), the method further includes determining (311) a region (101) that contains the coordinates (140) of the location (111) of the mobile device (109) and applying (313) the attributes (271, 273, 275, . . . , 277) of the mobile device (109) and attributes (281, 283, . . . , 285) of the region (101) to the predictive model to obtain an accuracy level (171) of the coordinates (140) of the location (111) of the mobile device (109).

In some implementations, the location coordinates (140) include a vertical location for a determination of whether the mobile device (109) is in a particular floor of a multi-floor building.

In some implementations, the prediction of the accuracy level (171) and/or the location coordinates (140) can be based on the location history of a mobile device (109) in relation with the current time of the day, the date of the week, the week of the month, etc.

In an application that uses location data, a configurable parameter can be used to identify a confidence threshold. When the accuracy level of location data is above a confidence threshold, the location data is considered to be of high-confidence. The application may be configured, for example, to use only the high-confidence data that would still allow it to perform the calculation and thereby excluding lower-confident data that would be superfluous in calculating the result without impacting the statistical significance. If there isn't enough high-confidence data to produce a result, the application can be configured to provide no result.

Figure 15:
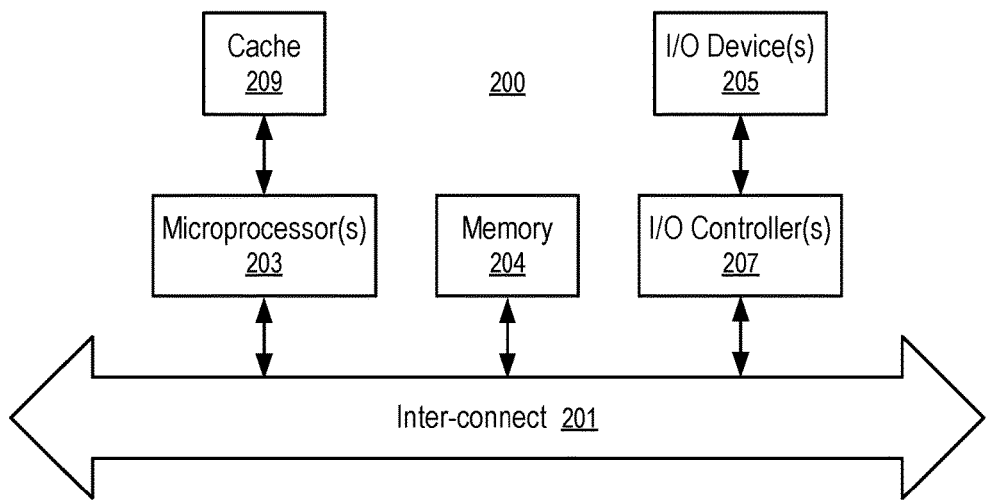
FIG. 15 illustrates a data processing system according to one embodiment.

The server (187) and/or the database (181) can be implemented as a computer apparatus in the form of a data processing system illustrated in FIG. 15.

FIG. 15 illustrates a data processing system according to one embodiment. While FIG. 15 illustrates various components of a computer system, it is not intended to represent any particular architecture or manner of interconnecting the components. One embodiment may use other systems that have fewer or more components than those shown in FIG. 15.

In FIG. 15, the data processing system (200) includes an inter-connect (201) (e.g., bus and system core logic), which interconnects one or more microprocessors (203) and memory (204). The microprocessor (203) is coupled to cache memory (209) in the example of FIG. 15.

In one embodiment, the inter-connect (201) interconnects the microprocessor(s) (203) and the memory (204) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. In one embodiment, when the data processing system is a server system, some of the I/O devices (205), such as touch screens, printers, scanners, mice, and/or keyboards, are optional.

In one embodiment, the inter-connect (201) includes one or more buses connected to one another through various bridges, controllers and/or adapters. In one embodiment the I/O controllers (207) include a USB (Universal Serial Bus) adapter for controlling USB peripherals, and/or an IEEE-1394 bus adapter for controlling IEEE-1394 peripherals.

In one embodiment, the memory (204) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented in a computing device, the method comprising:
   identifying, by the computing device, a region in which a mobile device is located, by at least:
      determining coordinates of the mobile device;
      determining an accuracy indicator of the coordinates of the mobile device;
      calculating a plurality of locations from the accuracy indicator and the coordinates of the mobile device, wherein the locations include a location specified by the coordinates of the mobile device and at least one location different from the location specified by the coordinates of the mobile device;
      determining one or more regions that contain the plurality of locations respectively, the one or more regions including the region in which the mobile device is subsequently identified to be located;
      evaluating, based on a portion of the plurality of locations that is in the region, a confidence level that the mobile device is located in the region; and
      making a determination that the mobile device is located within the region based on the confidence level being above a threshold.

2. The method of claim 1, wherein the accuracy indicator identifies a possible range of at least one of:
   longitudinal coordinate of the mobile device;
   latitudinal coordinate of the mobile device; and
   altitudinal coordinate of the mobile device.

3. The method of claim 1, further comprising:
   storing, in the computing device, mapping data that connect identifiers of cells in a grid reference system to regions that contain respective cells identified by the identifiers in the grid reference system; and
   converting, by the computing device, coordinates of the plurality of locations into respective cell identifiers in the grid reference system, wherein respective cells in the grid reference system identified by the respective cell identifiers contain respective coordinates from which the respective cell identifiers are converted;
   wherein the one or more regions are determined based on the one or more regions being connected to the cell identifiers in the mapping data.

4. The method of claim 3, further comprising:
   identifying a size of a cell that has an identifier in the mapping data and contains the coordinates of the mobile device; and
   selecting the at least one location, different from the location specified by the coordinates of the mobile device, based on the size of the cell.

5. The method of claim 4, wherein each respective location in the plurality of locations is assigned a predetermined weight for evaluation of the confidence level based on whether the respective location is in the region.

6. The method of claim 5, wherein the confidence level is based on one of:
   a sum of weights assigned to locations in the portion located within the region; and
   a sum of weights assigned to locations in a portion of the plurality of locations that is outside of the region.

7. The method of claim 5, wherein the predetermined weight is based on a distribution of probability of the mobile device being at locations in a local area represented by the respective location.

8. The method of claim 3, further comprising:
   receiving device attributes of the mobile device;
   identifying region attributes of the coordinates of the mobile device; and
   determining the accuracy indicator based on the device attributes and the region attributes.

9. The method of claim 8, wherein the determining of the accuracy indicator includes applying the device attributes and the region attributes in a predictive model trained using location data from a plurality of mobile devices having different device attributes and located in a plurality of regions having different region attributes.

10. A non-transitory computer storage medium storing instructions which, when executed by a computing device, instruct the computing device to perform a method, the method comprising:
   identifying, by the computing device, a region in which a mobile device is located, by at least:
      determining coordinates of the mobile device;
      determining an accuracy indicator of the coordinates of the mobile device;
      calculating a plurality of locations from the accuracy indicator and the coordinates of the mobile device, wherein the locations include a location specified by the coordinates of the mobile device and at least one location different from the location specified by the coordinates of the mobile device;
      determining one or more regions that contain the plurality of locations respectively, the one or more regions including the region in which the mobile device is subsequently identified to be located;
      evaluating, based on a portion of the plurality of locations that is in the region, a confidence level that the mobile device is located in the region; and making a determination that the mobile device is located within the region based on the confidence level being above a threshold.

11. The non-transitory computer storage medium of claim 10, wherein the method further comprises:
storing, in the computing device, mapping data that connect identifiers of cells in a grid reference system to regions that contain respective cells identified by the identifiers in the grid reference system; and
converting, by the computing device, coordinates of the plurality of locations into respective cell identifiers in the grid reference system, wherein respective cells in the grid reference system identified by the respective cell identifiers contain respective coordinates from which the respective cell identifiers are converted;
wherein the one or more regions are determined based on the one or more regions being connected to the cell identifiers in the mapping data.

12. The non-transitory computer storage medium of claim 11, wherein the method further comprises:
identifying a size of a cell that has an identifier in the mapping data and contains the coordinates of the mobile device; and
selecting the at least one location, different from the location specified by the coordinates of the mobile device, based on the size of the cell.

13. The non-transitory computer storage medium of claim 11, wherein the method further comprises:
receiving device attributes of the mobile device;
identifying region attributes of the coordinates of the mobile device; and
determining the accuracy indicator based on the device attributes and the region attributes.

14. A computing device, comprising:
at least one microprocessor;
memory storing instructions which, when executed by the at least one microprocessor, instruct the computing device to:
calculate a plurality of locations from coordinates of a mobile device and an accuracy indicator of the coordinates of the mobile device, wherein the locations include a location specified by the coordinates of the mobile device and at least one location different from the location specified by the coordinates of the mobile device;
determine one or more regions that contain the plurality of locations respectively, the one or more regions including a region in which the mobile device is subsequently identified to be located;
evaluate, based on a portion of the plurality of locations that is in the region, a confidence level that the mobile device is located in the region; and
identify the mobile device as being located within the region based on the confidence level being above a threshold.

15. The computing device of claim 14, wherein the instructions are further configured to instruct the computing device to:
receive device attributes of the mobile device;
identify region attributes of the coordinates of the mobile device; and
determine the accuracy indicator based on the device attributes and the region attributes.

16. The computing device of claim 15, wherein the accuracy indicator is determined by applying the device attributes and the region attributes in a predictive model trained using location data from a plurality of mobile devices having different device attributes and located in a plurality of regions having different region attributes.

17. The computing device of claim 14, wherein the computing device is configured to store mapping data that connect identifiers of cells in a grid reference system to regions that contain respective cells identified by the identifiers in the grid reference system; and the instructions are further configured to instruct the computing device to:
convert coordinates of the plurality of locations into respective cell identifiers in the grid reference system, wherein respective cells in the grid reference system identified by the respective cell identifiers contain respective coordinates from which the respective cell identifiers are converted;
wherein the one or more regions are determined based on the one or more regions being connected to the cell identifiers in the mapping data.

18. The computing device of claim 17, wherein the instructions are further configured to instruct the computing device to:
identify a size of a cell that has an identifier in the mapping data and contains the coordinates of the mobile device; and
select the at least one location, different from the location specified by the coordinates of the mobile device, based on the size of the cell.

19. The computing device of claim 18, wherein each respective location in the plurality of locations is assigned a predetermined weight for evaluation of the confidence level based on whether the respective location is in the region; and the predetermined weight is based on a distribution of probability of the mobile device being at locations in a local area represented by the respective location.

20. The computing device of claim 19, wherein the confidence level is based on one of:
a sum of weights assigned to locations in the portion located within the region; and
a sum of weights assigned to locations in a portion of the plurality of locations that is outside of the region.

* * * * *